July 7, 1964 H. V. ALEXANDERSSON ETAL 3,140,354
CIRCUIT ARRANGEMENT FOR OPERATION OF A SATELLITE EXCHANGE IN AN AUTOMATIC TELEPHONE SYSTEM
Filed Nov. 7, 1960 8 Sheets-Sheet 1

INVENTORS:
HARALD VALDEMAR ALEXANDERSSON
KARL GUNNAR BRUNBERG
ROLF AUGUST DAHLBLOM
BY: Hane and Nydick
ATTORNEYS INVENTORS:
HARALD VALDEMAR ALEXANDERSSON
KARL GUNNAR BRUNBERG
ROLF AUGUST DAHLBLOM
BY:
Hane and Nydick
ATTORNEYS July 7, 1964 H. V. ALEXANDERSSON ETAL 3,140,354

CIRCUIT ARRANGEMENT FOR OPERATION OF A SATELLITE EXCHANGE IN AN AUTOMATIC TELEPHONE SYSTEM

Filed Nov. 7, 1960 8 Sheets-Sheet 3

INVENTORS:
HARALD VALDEMAR ALEXANDERSSON
KARL GUNNAR BRUNBERG
ROLF AUGUST DAHLBLOM

BY: Hane and Nydick

ATTORNEYS

CIRCUIT ARRANGEMENT FOR OPERATION OF A SATELLITE EXCHANGE IN AN AUTOMATIC TELEPHONE SYSTEM

Filed Nov. 7, 1960

INVENTORS:
HARALD VALDEMAR ALEXANDERSSON
KARL GUNNAR BRUNBERG
ROLF AUGUST DAHLBLOM
BY: Hane and Nydick
ATTORNEYS INVENTORS:
HARALD VALDEMAR ALEXANDERSSON
KARL GUNNAR BRUNBERG
ROLF AUGUST DAHLBLOM
BY: Hane and Nydick
ATTORNEYS INVENTORS:
HARALD VALDEMAR ALEXANDERSSON
KARL GUNNAR BRUNBERG
ROLF AUGUST DAHLBLOM
BY: Hane and Nydick
ATTORNEYS INVENTORS:
HARALD VALDEMAR ALEXANDERSSON
KARL GUNNAR BRUNBERG
ROLF AUGUST DAHLBLOM
BY: Hane and Nydick
ATTORNEYS INVENTORS:
HARALD VALDEMAR ALEXANDERSSON
KARL GUNNAR BRUNBERG
ROLF AUGUST DAHLBLOM
BY: Hane and Nydick
ATTORNEYS

United States Patent Office 3,140,354

Patented July 7, 1964

3,140,354

CIRCUIT ARRANGEMENT FOR OPERATION OF A SATELLITE EXCHANGE IN AN AUTOMATIC TELEPHONE SYSTEM

Harald Valdemar Alexandersson, Lidingo, Karl Gunnar Brunberg, Segeltorp, and Rolf August Dahlblom, Hagersten, Sweden, assignors to Telefonaktiebolaget L M Ericsson, Stockholm, Sweden, a corporation of Sweden

Filed Nov. 7, 1960, Ser. No. 67,526

Claims priority, application Sweden Nov. 12, 1959

1 Claim. (Cl. 179—18)

The present invention refers to a circuit arrangement for operating a satellite exchange which co-operates with a main exchange in an automatic telephone system comprising selector stages which consist of selectors of cross-bar-type and in which the connection after the identification of the subscribers is set up by means of a marker through idle selector stages.

Different solutions for the co-operation between a satellite exchange and a main exchange are known. According to a known solution the satellite exchange comprises a marker co-operating with the marker of the main exchange in such manner that in setting up a conversation, the marker of the main exchange sets up a selector which corresponds to the satellite selector, exactly in the same manner as the satellite selector is set up by the marker of the satellite exchange. Said arrangement implies however that an additional selector in the main exchange and furthermore an additional line equipment for satellite subscribers in the main exchange will be necessary in order to connect said additional selector with the subscriber stage of the main exchange. Said line equipment will be operated upon a call and will be identified in the main exchange in the same manner as if the subscriber would be connected directly to the main exchange. Said solution necessitates however besides said additional selectors also an additional marker in the satellite and a double line equipment for the satellite subscribers, i.e. as well in the satellite as in the main exchange.

The object of the present invention is to obtain a circuit arrangement which allows co-operation between the main exchange and the satellite without necessitating a marker in the satellite, or necessitating an additional selector and double line equipment. The circuit arrangement according to the invention is substantially characterized by the fact that the satellite comprises an identifier for the satellite subscribers which are connected to the outputs of a bridge, which co-operates with a main bridge identical with said satellite bridge and which makes part of the subscriber stage of the main exchange in such a manner that the inputs of both are parallelly connected to the preceding selector stages in the main exchange, operating wires being arranged between the identifier of the satellite and the marker of the main exchange in order to set up the satellite bridge for incoming and outgoing calls to the same output as the main bridge so that the subscriber stage of the main exchange works exactly in the same manner when the subscriber is connected to the satellite as in the case when the subscriber is directly connected to the main exchange, without necessitating an additional selector in the main exchange.

Figure 1:
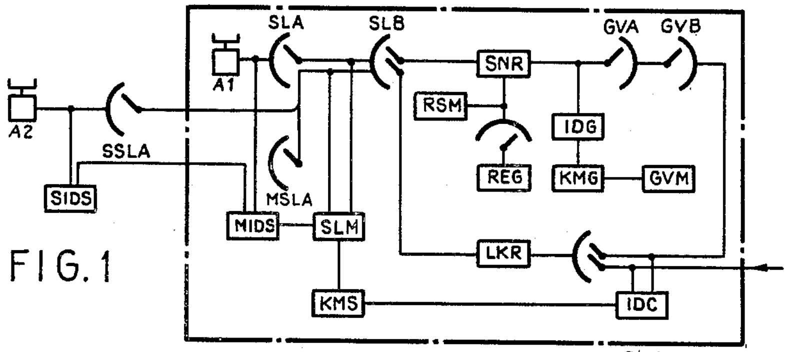
Figure 2:
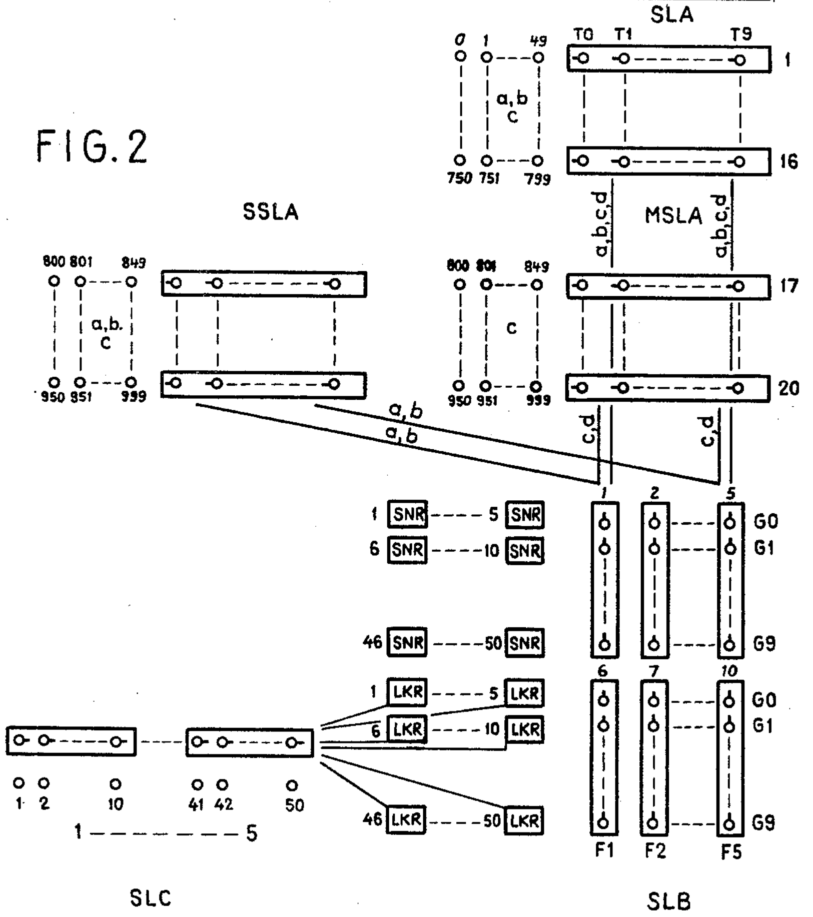
Figure 3:
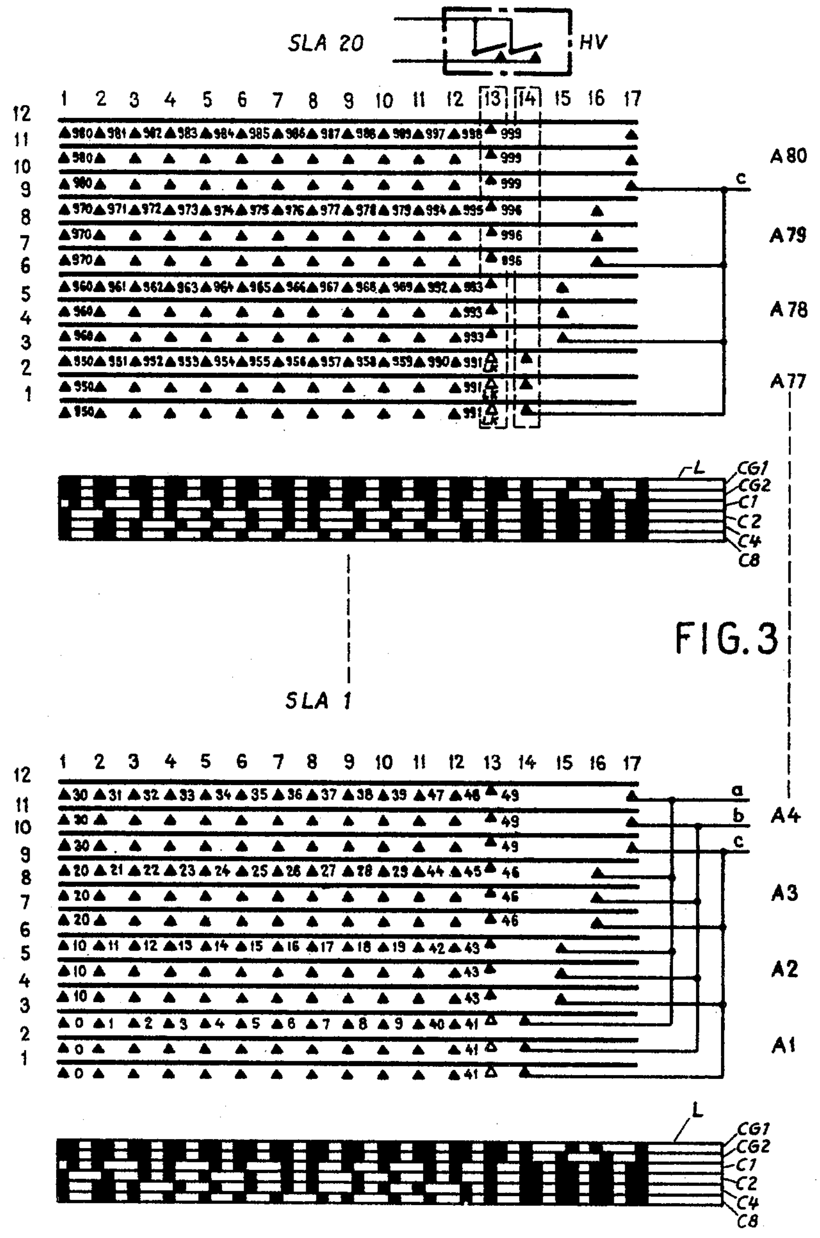

The invention will be explained more in detail by means of an embodiment with reference to the enclosed drawing. FIG. 1 shows a block diagram of a telephone system comprising a main exchange and a satellite associated with said exchange. FIG. 2 shows diagrammatically the placing of the bridges and of the connecting circuits in a main exchange and a satellite consisting of code relay selectors. FIG. 3 shows diagrammatically the grouping of the contacts in code relay selector bridges. FIGS. 4–9 show a circuit diagram more in detail of a telephone system on which the method of the invention has been applied.

FIG. 1 shows a diagram of a main exchange and a satellite connected to the same. Both may be composed of selectors of arbitrary type, which could work with dependent selection (a group of definite bridges in one stage co-operates with a group of definite bridges in the other stage). Upon a call from a subscriber A1 belonging to the main exchange, his line equipment is connected to the identifier IDS in a marker SLM, the subscriber is identified, after which the marker connects the subscriber to an idle connecting relay set SNR, through idle selector stages SLA and SLB, and through said relay set and through register finders RS to an idle register REG which after receiving digit information calls the identifier IDG in the following selector stage GV. IDG identifies the input and connects it to the code receiver KMG which receives a necessary number of digit information and connects the GVM-marker to the connection. GVM sets up an idle path by means of the digit information received and calls afterwards the identifier IDC of the SLC-stage. IDC identifies the input and connects the code receiver KMS to SNR. KMS receives a suitable number of digits from the register in order to enable the marker SLM by means of the information received to complete the connection to the subscriber called. The SLM-marker identifies the calling subscriber by means of IDS, it selects an idle connecting relay set LKR and through idle selectors sets up a connecting path from the input of the SLC-stage through LKR and through the stages SLA and SLB to the called subscriber. The process in the main exchange will be substantially the same if the call is coming from or going to respectively a subscriber connected to the satellite. Each subscriber in the satellite has an output in a selector in the subscriber stage MSLA of the main exchange in the same manner as a subscriber directly connected to the main exchange. The difference is that of the wires of the 3-pole connection which from the preceding stage can be connected to a bridge input, only two wires (speech wires *a*, *b*) are connected to the satellite bridge and only one wire (test wire *c*) to the main bridge as it will be more apparent from the description more in detail. The main selector and the satellite selector will be set up to the same output which is carried out in such manner that an identifier SIDS arranged in the satellite, transmits the identifying of the identifier of the main exchange upon an outgoing call and the identifier of the main exchange transmits the identifying to the identifier of the satellite upon an incoming call, through operating wires which connect the identifier of the satellite and the marker of the main exchange with each other. Thus it will be possible that the main exchange works completely independently of the fact whether the subscriber is located in the main exchange or in the satellite.

FIG. 2 shows diagrammatically an example of the grouping of the bridges and of the connecting relay sets upon application of the principle of the invention on a main exchange consisting of code relay selectors and a satellite exchange co-operating with the main exchange. The construction of the code relay selector has been described in the Swedish Patent 167,443. The exchange according to the embodiment is intended for connection of 50 incoming and 50 outgoing lines for 1000 subscribers, of which 200 are connected to the satellite and 800 directly to the main exchange. The incoming lines are connected to the input of 50 SLC-bridges belonging to 5 SLC-selectors. The SLC-bridges have 50 outputs and all the 50 bridges in the 5 SLC-selectors are multiplied so that they have access to the inputs of 50 SLB-bridges through connecting relay sets LKR permanently connected to said inputs. Additional 50 SLB-bridges are arranged, to the inputs of which connecting relay sets SNR for outgoing calls are connected. The SLB-bridges which are located in 10 selectors have each 40 outputs and are multiplied in such manner that 20 bridges, which are located in 2 horizontally multiplied selectors, have access to 40 definite SLA-bridges, 10 of said 20 SLB-bridges having permanently associated connecting relay sets SNR used for outgoing calls while 10 of said bridges having permanently associated connecting relay sets are used for incoming calls. The 800 subscribers in the main exchange are connected to 16 SLA-selectors, each comprising 10 bridges, which are multiplied to the same 50 subscribers. The 200 satellite subscribers have in the same manner 4 MSLA-selectors, the bridge inputs of which are connected to the same outputs of the SLB-selectors as the corresponding 4 SSLA-selectors of the satellite. Also these selectors have each 10 bridges horizontally multiplied to 50 subscribers. The satellite comprises an identifier SIDS which by means of operating signals co-operates with the identifier MIDS of the main exchange in such manner that a bridge in the SSLA-selectors will be set up to the same output as the corresponding main bridge in the MSLA-selectors and vice versa as it will be explained more in detail. Consequently the main exchange can work in the same manner as if all the subscribers would be connected to the main exchange. As appears from the symbolic representation, an SLB-bridge belonging to a definite SLB-selector can reach the inputs of those SLA-bridges which are located in two vertical SLA-bridge rows co-operating with the respective SLB-selector, each of said SLA-bridge rows comprising 20 bridges.

FIG. 3 shows the grouping of the contacts of the code relay selector bridges in the first and the 20th selector of the SLA-stage. The code relay selector according to the embodiment has 12 horizontal and 17 vertical contact rows and 12 contact rods, with which the contacts belonging to the same horizontal row can be brought into contact. 13 vertical rows comprises 50 (theoretically 52) 3-pole outputs, while the 3-pole input is connected to a 3-pole contact group in each of the vertical rows 14–17 so that by operating one of the vertical rows 1–13 and one of the vertical rows 14–17 the input can be brought into contact with one of the 50 outputs as is easy to understand. As a horizontal row comprises 12 or 13 contacts respectively, the subscribers are numbered in such manner that the first 10 contact groups, each consisting of 3 contacts in the 12 horizontal rows, are numbered from 0 to 39, while the last two contact groups in the horizontal rows 1–3 and 4–6 and the last three contact groups in the horizontal rows 7–9 and 10–12 form the number group 40–49. Correspondingly are formed the number groups 90–99, 140–149 and so on. According to the example the subscribers connected directly to the main exchange have the outputs 000–799 and the subscribers connected to the satellite have the outputs 800–999 as well in the MSLA- as in the SSLA-selectors.

The vertical contact rows are operated by means of lifting means which in turn are generated upon operation of the bridge magnet which latter according to the principle of the code relay selector, during its operation allows closing of the selected contacts by spring force. Only two of said lifting means can move and can pass freely through recesses in a number of parallel, ribbon-shaped code rods L. By displacing of a suitable number of code rods it can be obtained that through-recesses occur below two required vertical contact rows so that the input can be connected with an output required. The 6 code rods with their recesses are diagrammatically shown in FIG. 3 while the code magnets, which displace the rows longitudinally, are not shown. Only their reference numeral is indicated on the associated code rod. In the position according to FIG. 3 there are through-recesses below the vertical rows 13 and 14 in both the bridges shown. This is the so-called home-position of the bridge, in which no outgoing connection is found, as the contact group LK shown by white symbol, is not in connection with any subscriber terminal. After the end of the conversation the contacts are maintained in closed condition by spring force and they can be maintained in said condition until the bridge will be operated next time. In the selectors MSLA and SSLA intended for the satellites, the bridges will however be restored as soon as the conversation has been finished in order to release in said manner the interruption relay of the subscriber which relay is operated as long as the bridge is in operated state. For this purpose a restoring contact HV is arranged, which in the operated position of the bridge closes a circuit in order to allow operation of the bridge magnet and to cause restoring to the position shown in FIG. 3 as will be explained later on. The releasing of the satellite subscriber can of course be carried out also in different manner than by restoring the bridge but in said case more complicated operating means will be necessary.

FIGS. 4–9 show an automatic telephone system comprising a main exchange and a satellite on which the principle of the invention has been applied. Only those parts are shown which have importance from the point of view of the invention. The function of the device can be explained more suitably when describing a call coming from a satellite subscriber and of a call going to a satellite subscriber respectively.

If a call is made by a subscriber belonging to the satellite, for example the subscriber having number 800, the identifying relay SA65 (FIG. 4) corresponding to the horizontal row of the output will be operated in the identifier SIDS of the satellite. As appears from FIG. 3 one A-relay corresponds to each of the horizontal contact groups each comprising 3 contact rows, thus 4 A-relays for each selector and one B-relay for each of the vertical contact rows, altogether 13. As there are altogether 20 SLA-selectors, the number of A-relays is 80, of which 16, according to the embodiment A65–A80 are intended for the satellite subscribers as well in the satellite as in the main exchange. The relays of the satellite are designated by SA, SB and so on and the relays of the main exchange by MA, MB a.s.o. for the sake of simplicity. It is easy to understand with reference to FIG. 3 that in order to identify, for example the satellite subscriber 800, the relays SA65 and SB1 have to operate. The relay SA65 operates by means of plus through a break contact of the relay BR, through the subscriber loop to minus on the break contact of the relay SW and it holds itself by means of a holding winding from plus on a break contact of the relay SW. Secondarily to the relay SA65 operates the relay SAA which interrupts the current path of the operating winding of the relay SA65 and connects operating potential to the relay SA165, which is a secondary relay of SA65 and has for object to change the potential of the subscriber loop to the SB relays, a number of which can operate in correspondence with the simultaneously called subscribers but one of them is selected by breaking out. It is presumed that the relay SB1 belonging to the subscriber in question has operated. The operation of the relay SB1 interrupts the current path for the relay SBA which is a spacing current relay and releases consequently, causing hereby operation of the relay SBB. By operation of the relay SBB plus polarity is connected from a make contact of the relay SBB through the wire 2 to the main exchange (FIG. 6) and through the wire 14 to the winding of the relay MAU (FIG. 5), which at its other end is connected to minus polarity through a break contact of the relay MAA in the main exchange. By operation of the relay MAA minus polarity is connected to the wire 35 (FIGS. 5–6) through a make contact of the relay MAU and through the wire 11 to the relay SAN in the satellite (FIG. 4) which relay operates as an acknowledgment that the main exchange has perceived the call. By operation of the relay SAN current paths are connected from the identifier SIDS of the satellite through connecting lines to the identifier MIDS of the main exchange in order to transmit the identification to the latter. There are 10 pairs of conductors for signalling between the main exchange and the satellite. Of the 20 wires the wires 1, 2, 11, 12 are used for call and acknowledgment between the satellite and the main exchange, the wires 3–10 for transmitting the identification between the satellite and the main exchange and vice versa, the wires 13–16 for operation of the satellite bridges and the wires 17–20 for current supply to the satellite.

The identification between the satellite and the main exchange is transmitted in both directions by means of code senders and code receivers respectively. The first mentioned consist of current paths passing through the contacts of the operated A- and-B-relays and the last mentioned of a number of relays, according to the example D1–D4 and E1–E4 which operate in combination and close current paths for operation of a relay SA and a relay SB corresponding to the already operated MA- and MB-relay or vice versa. When the relays SA65 and SB1 in the satellite have operated according to the example, plus polarity is connected from a make contact of the relay SAN through make contacts of the relay SBL (FIG. 4) and through the wires 3–6 to the relays MD1–MD4 respectively through make contacts of the relay SA65 and the wires 7–10 to ME1–ME4 in the main exchange (FIG. 6), which all operate as operation of the relays SA65 and SB1 causes current supply to all the 8 current paths. Operation of anyone of the relays MD causes operation of the relay MDA whereby an operating impulse is supplied from a make contact of the relay SBB in the satellite (FIG. 4) on one hand to the relay MB1 in the identifier of the main exchange (FIG. 5) through the line 2, the wires 14 (FIG. 6), make contact of MDA, make contacts of the operated MD-relays and the wire 1, on the other hand to the relay MA65 in the identifier of the main exchange, similarly through the line 2, the wire 14, make contact of MDA, make contacts of the operated relays ME and the wire 19. The relays MA65 and MB1 in the identifier of the main exchange operate, whereby the identifying is transmitted from the satellite to the main exchange. Secondarily to the operation of the relay MA65 in the main exchange the relay SW in the satellite operates by minus through the make contacts of the relay MAA and of the relay MA65, the current path 37 and the wire 1, whereby on one hand a current path is completed through a make contact of the relay SW to a connecting relay SVMA of the selector SSLA17 in the satellite, on the other hand plus polarity is connected to the current path 12 and thus to the main exchange, where the relay MDEA operates.

The operation of the relay MB1 causes releasing of the relay MBA, which is a spacing current relay. Relay MBB operates secondarily to the releasing of the relay MBA. From a make contact of the relay MBB minus polarity is connected to the relay MVMA which has for purpose to prepare the operating paths for the code magnets of the selector, to which the satellite subscriber belongs. It is easy to understand with reference to FIGS. 2 and 3 that the satellite subscriber is connected to the selector SSLA17 in the satellite, which selector co-operates with MSLA17 in the main exchange. By operation of the relay SA65 it is determined that the satellite subscriber belongs to this selector, owing to the fact that, as appears from the above mentioned, the relays SA65–SA86 belong to this selector, the relays SA69–SA72 to the selector SLA18 a.s.o. The task of the connecting relay MVMA is furthermore to connect to the marker upon its operation test wires for all the bridges of MSLA17. As testing wire a wire connected to the bridge magnet is used different from conventional cross bar selectors, in which the busy condition is marked by means of a contact on the bridge. The test wires may have two different conditions. If the bridge is idle, there is no polarity on the line, if the bridge is busy, there is plus polarity. The marker comprises a number, in this case 10, test relays 1T0–1T9 (FIG. 7) corresponding to the number of the bridges in a selector. The MVMA-relay connects the test relays on one hand to the test wires, on the other hand simultaneously to minus through the resistances M0–M9. The test relays corresponding to idle bridges, operate by means of minus through the resistance, as the testing wire has no potential, while those test relays which correspond to busy bridges, cannot operate, as the plus polarity on the test wire short-circuits the winding.

After that the marker has defined which MSLA-bridges are idle, the marker tests which of the SLB-bridges, which can co-operate with the idle SLA-bridges, are idle. Through contacts of the idle and consequently operated test relays 1T0–1T9 potential is connected to the connecting relays VMB1–5 belonging to those SLB-selectors which can come in question. As mentioned before part of the SLB-bridges co-operates with relay sets SNR and part of the bridges co-operates with relay sets LKR so that upon an outgoing call only the selectors SLB1–5, while upon an incoming call only the selectors SLB6–10, can come in question. The marker determines which of these two groups should be used thereby that the operating paths of the VM–B-relays going through make contacts of the test relays 1T0–1T9 pass also through a make and break contact of a relay MRN (FIG. 5) which only operates upon an incoming call and conncets minus polarity to the operating path 5 while upon an outgoing call it connects minus polarity to the operating path 4, so that in the first-mentioned case only the relays VMB6–10 and in the second case only the relays VMB1–5 can operate.

Figure 7:
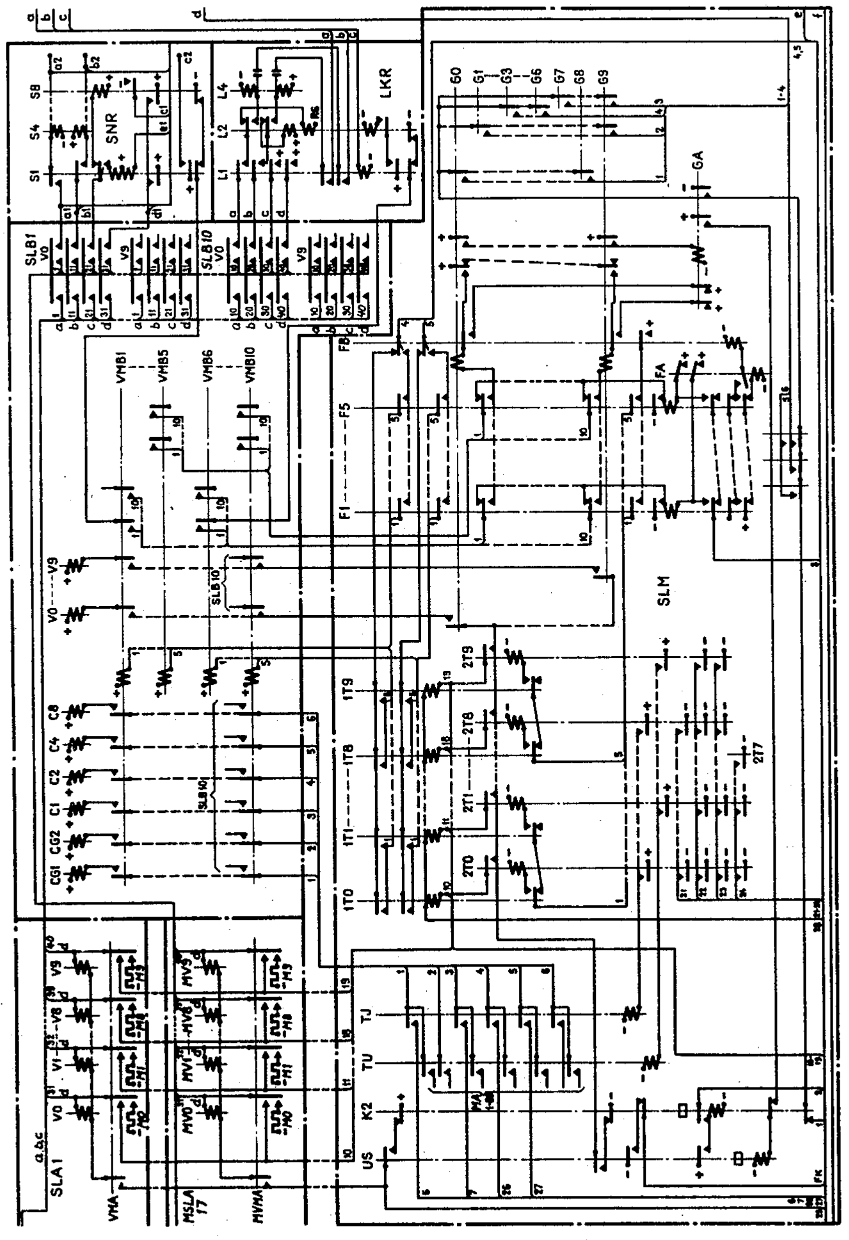
Figure 8:
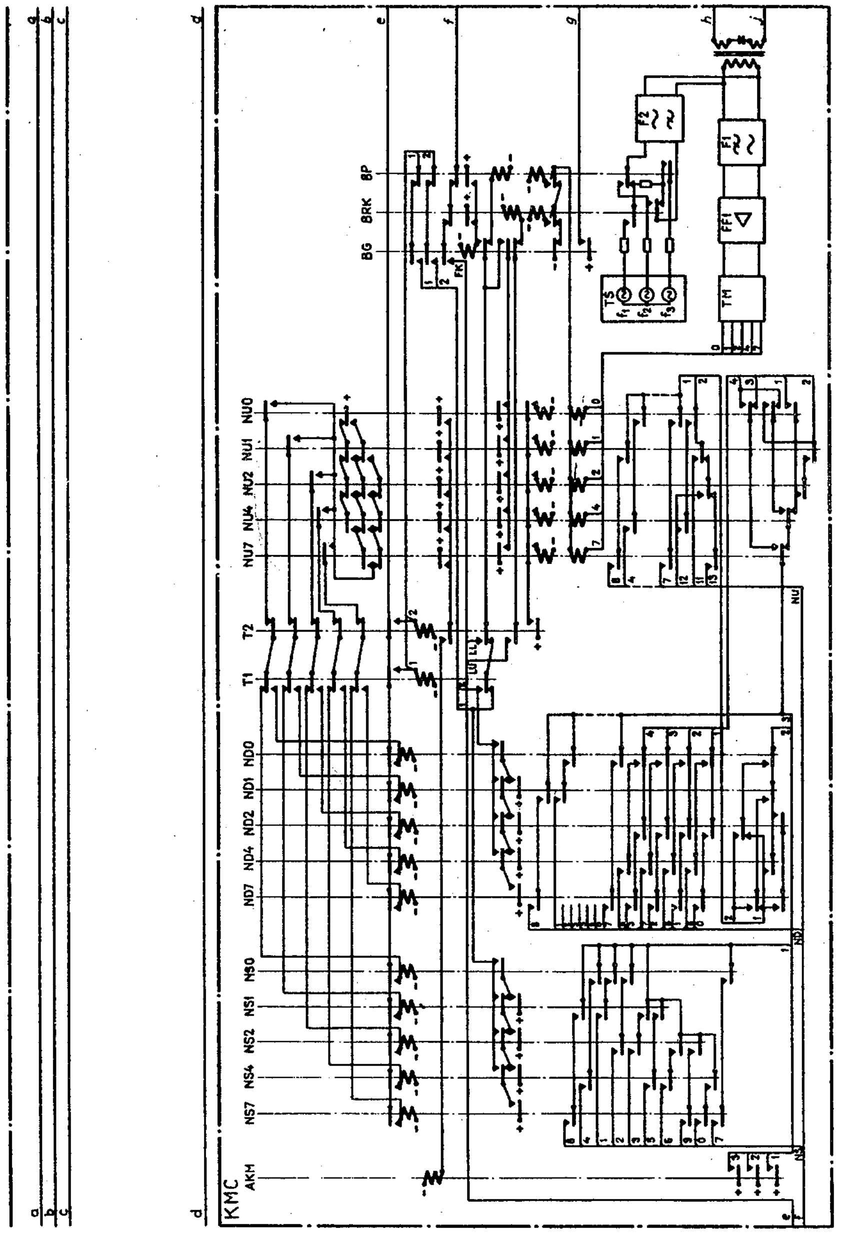
Figure 9:
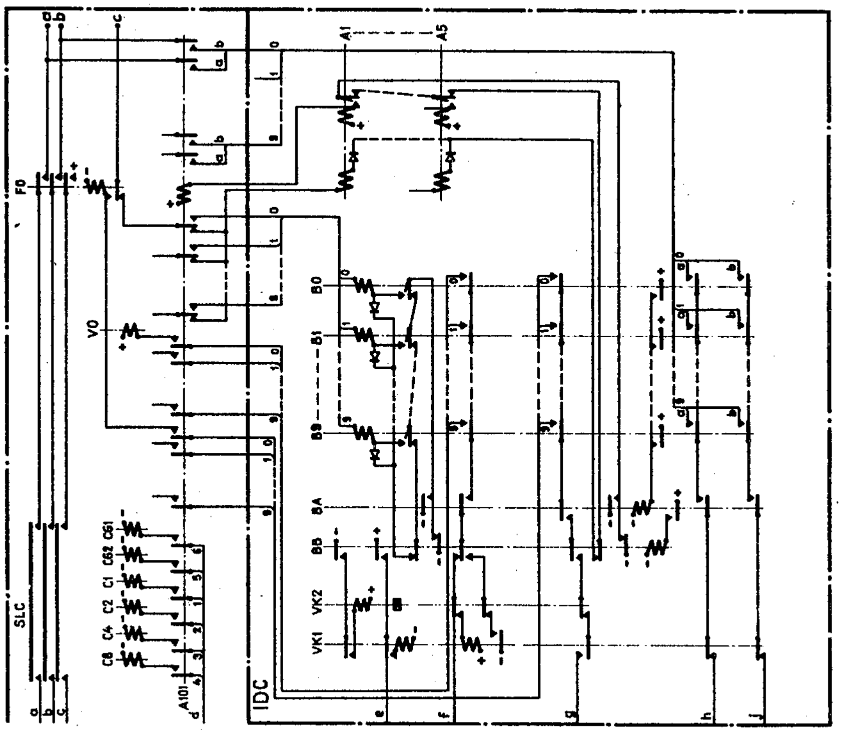

As each of the bridges SLB, which come in question for outgoing calls, belongs to a connecting relay set SNR, implies a testing of the idle SLB-bridges also testing of the idle connecting relay sets SNR. All the 50 connecting relay sets are connected through the contacts of the relays VMB1–5, to 5 relays F1–F5, each corresponding to one SLB-selector respectively to the 10 connecting relay sets belonging to said selector. If there is at least one idle connecting relay set belonging to an SLB-selector, the F-relay corresponding to the selector operates by means of minus polarity which is obtained only from idle SNR relay sets through break contacts of the relays S8 and S1 (FIG. 7). If a number of connecting circuits belonging to different SLB-selectors are idle, the relays F corresponding to the respective selectors operate and one of said relays will be broken out, for example F1. Secondarily the relay F releases and causes operation of the relay FB which connects another relay chain G0–G9 to the 10 connecting circuits belonging to the respective SLB-selector. One of said connecting relay sets is selected by operation of one of the G-relays, for example G0, which disconnects the other connecting relay sets. By operation of one F-relay and one G-relay the connecting circuit and hereby also the SLB-bridge is defined, according to the example the bridge V0 in the selector SLB1. This implies that also the two vertical bridge rows in the selectors SLA are determined. As of the 40 bridges in said two vertical rows only those bridges can be reached by the subscriber, which are located in the selector of the subscriber (FIG. 2), a selection has to be carried out between these two bridges, if both are idle. The relay F belonging to the broken out SLB-selector connects operating plus to one or two secondary test relays, according to the example 2T0–2T1, through contacts of the operated primary SLA-test relays 1T0–1T1. One of the secondary relays, for example 2T0, operates and prepares a current path for the operation of the respective SLA-bridge.

Figure 5:
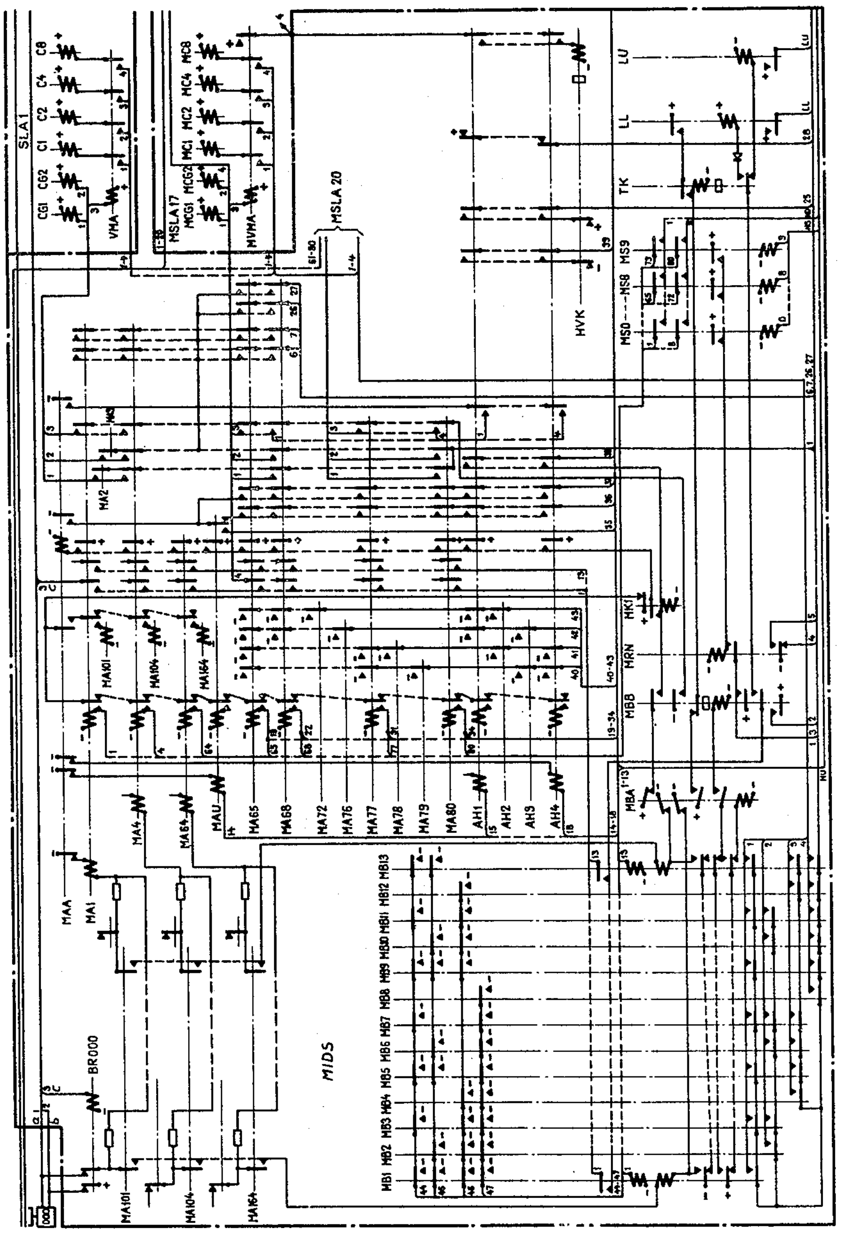

According to the embodiment the relays MA65 and MB1 have operated in the SLM-identifier MIDS, corresponding to the subscriber terminal number 800, which implies that the third code rod from above (FIG. 3) has to be operated, as the terminal is located in the lowest row of contact groups at the left as is easy to understand. This is carried out by means of the code magnet MC1 (FIG. 5). The code magnet MC1 operates through a make contact of the relay MB1 by means of minus from a make contact of the relay GA (FIG. 7), through a break contact of the relay K2 and through the wire 1. In correspondence to the SLA-bridge selected, for example V0 in SLA17, the output 17 in the SLB-bridge selected has to be pointed out. The contact grouping of the SLB-selector is not shown in the drawing but it is easy to see with reference to FIG. 3 that when having a 4-pole connection, which is necessary in the B-stage, the number of outputs will be 42 instead of 52 (in practice 40 instead of 50). When presuming that in order to set up the SLB-selector to the output 17, the code magnets CG1, C1, C2 and C4 have to be operated, also these magnets obtain minus from the contact of the operated GA-relay (FIG. 7), a break contact of the relay K2, wire 1, make contacts of the relay MA65 (FIG. 5) through current paths 6, 7, 26, 27 and a make contact of the relay TJ (FIG. 7) which has operated secondarily to the operated relay 2T0. This last mentioned has operated secondarily to the test relay of the selected A-bridge, as mentioned before. Depending on the fact whether odd or even test relays T operate, the relay TU or TJ is operated. The explanation of this fact is that a B-bridge can alternatively co-operate with 2 A-bridges according to the grouping plan in FIG. 2.

It has to be pointed out that the connecting process hereabove described for the sake of simplicity does not take account to the connecting of the subscriber to a register as this has no importance in view of the fundamental idea of the invention but it is supposed in this instance that a connection to an idle connecting relay set is carried out at first. In reality of course also selection of an idle register makes part of the connecting process and connection to an idle connecting relay set is carried out at first when an idle register has been selected.

Figure 4:
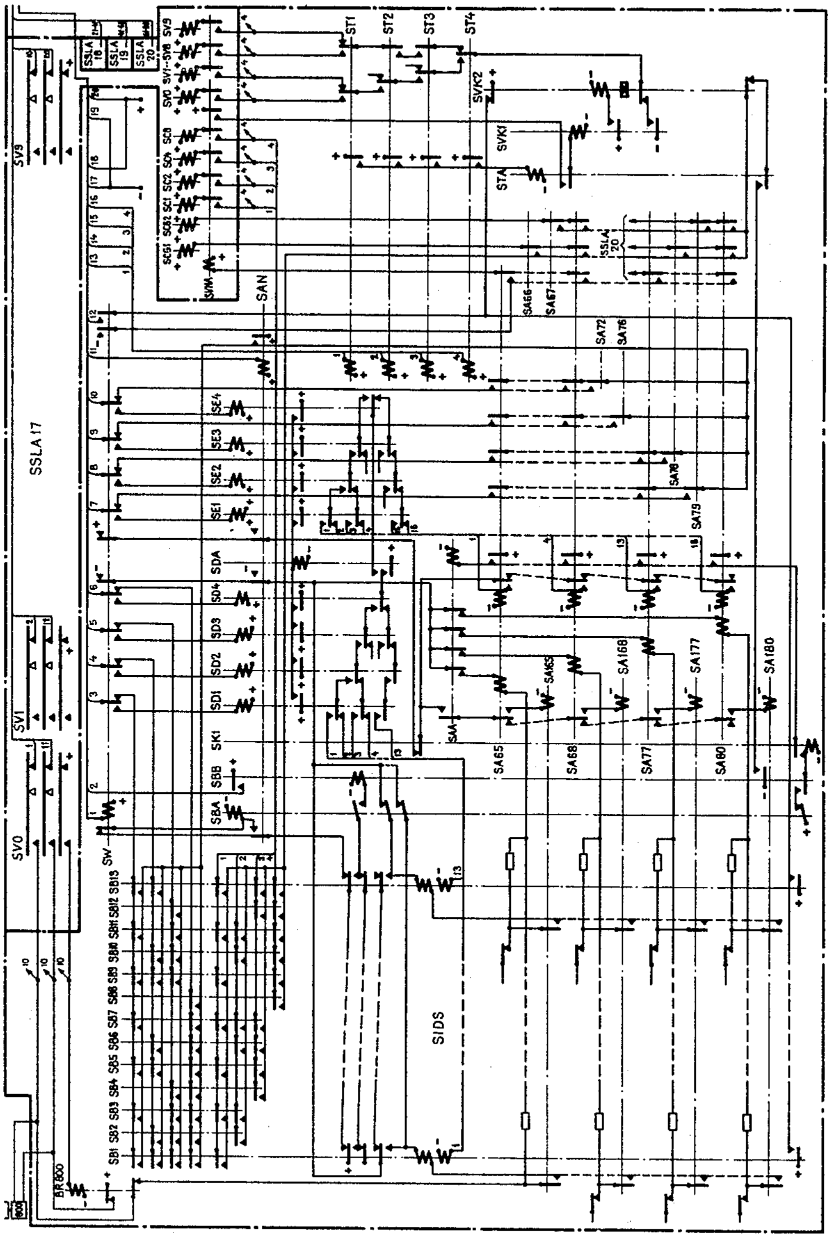

The operation of the relay 2T0 in the marker of the main exchange connects minus polarity through current paths 21–24, through a make contact of the relay MDEA (FIG. 6) (which already has operated secondarily to the operation of the relay SW in the satellite) and through the paths 13–16, to the relays ST1–ST4 in the satellite (FIG. 4). Through the 4 current paths a code is transmitted to the satellite, which defines the identity of the A-bridge selected among the 10 bridges, so that operation of an SSLA-bridge identical with the MSLA-bridge selected in the main exchange, is prepared. Secondarily to the operation of the relays ST, the relay STA operates in the satellite. Operation of the relay STA implies on one hand that the relay SVK1 operates and causes operation of the relay SVK2, on the other hand that the code magnets, according to the example only the code magnet SC1, operate by means of minus on a make contact of the relay SBB, through a make contact of STA, a break contact of SVK2 (which is slow in operation and could not yet operate) and through contacts of the operated relay SB1. By operation of the relay SVK1 operating current is connected to the selected bridge SV0 through the contacts of the operated ST-relays.

Secondarily to the operation of the relay GA in the marker, the relay US operates. Operation of this relay causes operation of the selected bridge MV0 in the main exchange, by means of plus through a break contact of the relay K2, a make contact of the relay US, a make contact of the relay MVMA, the winding of the selected MV0-relay, a make contact of MVMA, the current path 10 through the make contact of the operated relay 2T0, a make contact of the relay US, and a break contact of the relay K2, to minus. Operation of the relay US causes on the other hand operation of the relay K2 which is slow in operation. The operation of the B-bridges is carried out similarly by means of minus through a make contact of the relay US, through a make contact of the operated GO-relay and through a make contact of the relay VMB1. The current to the code magnet is interrupted as soon as the bridges have obtained operating current, owing to the fact that the relay K2, which is slow in operation, operates secondarily to the relay US. The relay K2 interrupts the current for US, so that the operating current path to the bridges ceases, whereby the bridges now are restored. Exactly the same is the process in the satellite, in which the relay SVK2, which is slow in operation, operates secondarily to the relay SVK1 and interrupts the operating current paths as well for the operated SV0-bridge as for the code magnets. In consequence of the operation of the SV0-bridge, operating current is connected to the interrupting relay BR of the subscriber, through the *c*-wire from the bridge and by the operation of the BR-relay the current is disconnected from the operated identifying relay SB1 in the identifier of the satellite. Releasing of the relay SB1 causes disconnection of operating plus polarity from the current path 12 between the satellite and the main exchange which causes releasing of the relay MDEA in the main exchange. Releasing of the relay MDEA causes interruption of the current paths 21–24 to the satellite, so that the operated ST-relays will release in the satellite. Releasing of the relay SB1 causes also operation of the relay SBA and releasing of the relay SBB. SK1 operates during the releasing time of the relay SBB and it interrupts the current for SA65 and it releases as a control that all the SA-relays are in rest. Also the relays SVMA, SA165 and SAA in the satellite will release. As a consequence of the releasing of the ST-relays also the relay STA in the satellite will release, whereby the relay SVK1 releases and secondarily releases the relay SVK2. Owing to the releasing of the relay SBB the relay MA65 and MB1 will release in the main exchange. Releasing of the relay MB1 causes operation of MBA. During the releasing time of the relay MBB the relay MK1 will operate. Releasing of the relay MA65 causes furthermore releasing of the relay SW in the satellite. The relay SAN in the satellite releases as a consequence of the releasing of the relay MAU in the main exchange and all the remaining relays in the main exchange will release. The relay U1 in the marker has operated by means of plus on the *d*-wire which now is plus-marked from a make contact of the relay S8 in the SNR, which latter has operated by means of minus through a resistance *r* on the *c*-wire, as soon as the connection to SNR is ready. There is a U-relay for each of the 40 bridges, which are intended for the satellite and each U-relay is operated as long as a conversation through the respective bridge continues. The function of the U-relay will be explained later on in connection with the description of the resetting of the bridges to home-position.

When a call is coming from outside to a satellite-subscriber, for example the subscriber having number 800, the process will be the following. It is assumed that the connection is already ready to the input of an SLC-bridge, which is permanently connected to an incoming line. This implies that the test wire of the incoming line is plus-marked. The identifier of the SLC-stage, which is a normal one-wire identifier, will be called. There are 50 incoming lines to the SLC-stage as appears from FIG. 2 and consequently there are 5 relays A1–A5 corresponding to the 5 horizontal wires and 10 relays B0–B9 in correspondence to the 10 vertical wires of the identifier. At first one of the A-relays will operate, for example A1, in the case the input having number 1 is called. Secondarily to the relay A1 the relay A101 operates and it obtains holding and switches the current paths to the B-relays. One of the B-relays corresponding to the line calling, in this case B0, operates, whereby the line is identified. The identifier connects the *a*- and

*b*-wire of the incoming line to a code receiver KMS (FIG. 8) which receives the digit signals from the register and sends reply signals to the register. The signalling between the register and KMS can be carried out by means of an arbitrary signalling system, according to the embodiment it is however presumed that voice frequency signalling is used. Voice frequency signalling between a sending and a receiving means in a telephone system is previously known, for example from Swedish Patent 122,189, for which reason no explanation of said principle is necessary. As diagrammatically shown, KMS comprises a voice frequency receiving part TM which through a filter F1 and an amplifier FF1 receives digit signals with 2 of 5 frequencies, whereby 2 of 5 voice frequency sensitive relays are operated, which cause in turn operation of 2 relays of 5 for each digit. For the units are the relays NU 0, 1, 2, 4, 7 operated, for the tens the relays ND 0, 1, 2, 4, 7 and for the hundreds the relays NS 0, 1, 2, 4, 7. In order to more in detail elucidate the function of the code receiver it is supposed that the subscriber having number 800 is called. At first the digit 8 is sent, having the consequence that the relays NU1 and NU7 operate, which obtain plus through the wires from the voice-frequency receiver TM and minus from the break contact of the relay BG. By the operation of the relays NU1 and NU7 current paths are closed to the relays NS1 and NS7 by means of plus through contacts of the relays NU1 and NU7 and through break contacts of the relays T1 and T2. The relays NS1 and NS7 obtain self-holding by means of plus from a make contact of the relay BB which has operated in the identifier IDC.

As soon as the relays NS in KMS have operated, they will connect plus to the relay BP which operates and is held by means of a holding winding and by means of plus from a voice frequency receiver as long as voice frequency sending for the first digit continues. The relay BP connects the frequencies *f*2 and *f*3 from the voice frequency sender to the filter F2 in order to signal to the register that the first digit has been received. The relay BG operates secondarily to BP. After receiving of the answering signal, the register ceases to send the first digit, upon which the NU-relays and the BP-relay release and the current path 1 is connected from the contacts of the NS-relays to the relay T1, so that this latter operates and switches the incoming 5 wires to the relays ND 0–7. When the relay T1 has operated, the relay BG releases, so that KMS can receive the second digit. The second digit was 0 which implies that the relays NU4 and NU7 operate and close corresponding current paths to the relays ND4 and ND7.

After this the same process is repeated as after the first digit. Plus polarity is connected through contacts of the two operated ND-relays and through a make contact of the relay T1 to the relay BP which operates and holds itself by means of plus from the voice frequency relays of the voice frequency receiver through the windings of the NU-relays, as long as the signal is coming to the code receiver. By operation of the relay BP, a reply signal is sent to the register signalling that the second digit has been received and the reply signal consists similarly as in the preceding case of the frequencies *f*2 and *f*3. After receiving the answering signal the register ceases to send the second digit. Secondarily to the relay BP the relay BG operates as in the preceding case. When the signal from REG ceases, the BP-relay will release upon which contacts of the operated ND-relays will connect plus through a make contact of T1 and a make contact of BG to the relay T2 which operates and interrupts the current paths to the relays ND, which however are held through their own contacts.

When T2 has operated, the BG-relay releases and KMS can receive the third digit. Two of the relays NU, according to the example NU7 and NU4, operate as before corresponding to the digit 0. AKM operates through make contacts of the relays NU and T2 and through contacts of the relays NS1 and NS7 a current path is completed from a contact of relay AKM, corresponding to the digit 8, to the IDS-identifier (FIG. 5) in which the relay MS8 operates and prepares current paths to those selectors through which the subscribers having number 800–899 can be reached. According to the grouping plan these selectors are SLA17 and SLA18. The relay MS8 is holding itself through a contact of relay AKM. The relays ND4 and ND7 (FIG. 8) complete the current path corresponding to the digit 0, from plus on the relay AKM to IDS. This implies that the relay MA65 in the identifier operates, which according to the example identifies the first line in the seventeenth selector. This is easy to understand considering that there are altogether 80 A-relays corresponding to the 4 horizontal rows of contact groups in each of the 20 selectors (FIG. 3). The number of the B-relays is 13 and they represent the 13 vertical rows in the SLA-selectors. Two horizontal contact group rows in each selector comprise 13 outputs, while 2 horizontal contact group rows comprise 12 outputs, so that it not always will be possible to determine the respective A-relay only by means of the second digit but for certain numbers also the last digit has to be used for determining the A-relay. As appears from the contact grouping in FIG. 3 the A-relays belonging to the 40 outputs beginning with 0, 1, 2 and 3 can be determined immediately, while the 10 outputs beginning with 4 can be distributed over all the 4 rows, for which reason it is necessary to know the unit in order to allow determination of the horizontal row. As the subscribers in a hundred-group are distributed in two selectors, in one selector the ten 4 and in the other selector the ten 9 will be insufficient for allowing determination of the A-relay and they have to be dependent on the operation of the unit relay. The current paths are built up in a corresponding manner and as appears from FIG. 6, the current paths 0–3 and 5–8 receive current directly from the contact of the relay AKM, while the current paths 4 and 9 are determined by means of the unit digits. It appears however from the circuit diagram how also said current paths are determined after the operation of the unit relays. This does not need however more explanation as it has no importance from the point of view of the invention.

Figure 6:
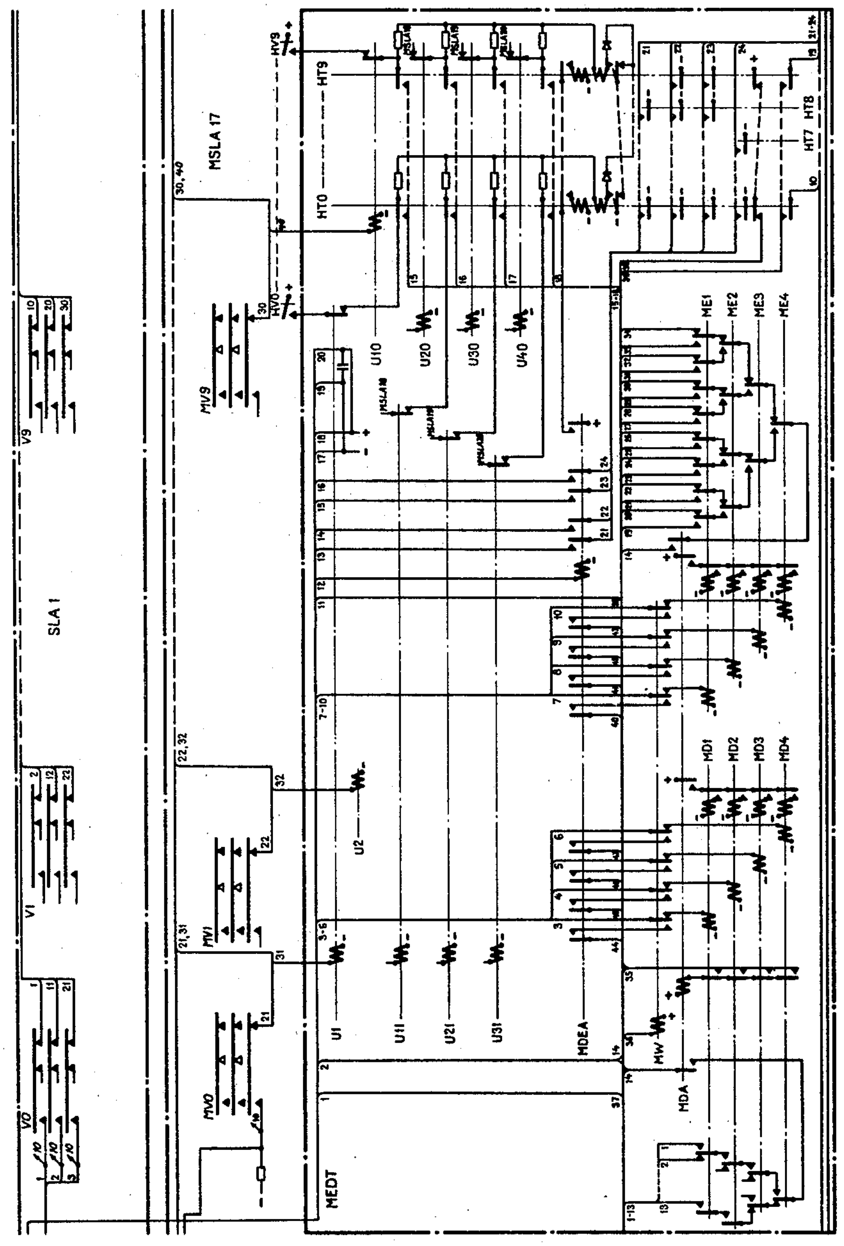

The relays NU complete one of the current paths 1–13 in order to operate one of the relays MB1–MB13, according to the example MB1, which defines the vertical row in each selector. By the operation of the relays MA65 and MB1 the calling subscriber is identified, as has been explained in connection with an outgoing call. As a consequence of the operation of the relay MS8 also the relay MRN operates, through the switching contact of which the current paths extend for selection of an idle connecting relay set SNR or LKR. As the MS-relays do not operate upon an outgoing call the current path 4 will be completed, while upon an incoming call the current path will be connected, so that the testing paths are connected to the LKR-circuits only. Secondarily to the operation of the relay MA65 the relay MAA will operate and secondarily to the operation of the relay MB1 the spacing current relay MBA, which causes operation of the relay MBB and of the relay TK. The purpose of the relay TK is to care for the idle or busy signalling in the direction of the line. As MBB is slow in operation, TK will operate during the operating time of the relay MBB and will connect the *c*-wire to the relay LL through contacts of the relays MA65, MB1 and MBB. When the subscriber is idle and consequently his *c*-wire has no potential, the winding of the relay LL will obtain minus polarity through a resistance *r* and through the *c*-wire and it will operate. If on the other hand the subscriber is busy, his *c*-wire is plus-mark so that the LL-relay cannot operate. After a time the relay TK releases as a consequence of the releasing of the relay MBB and the relay LU is connected to the *c*-wire. If the subscriber is idle, the relay LU cannot operate, as the relay TK obtains holding from a make contact of the relay LL and the current path to the relay LU is interrupted, on the other hand the relay LU can operate, if the *c*-wire is plus marked as a consequence of that the subscriber is busy. The relays LL and LU connect plus to two alternative current paths LL and LU. If the line LL obtains plus potential, the relay BP will operate through a make contact of T2 and will supply to the register an idle signal consisting of the frequencies *f*2 and *f*3. If on the other hand the conductor LU obtains plus potential, the relay BRK will operate and will supply to the register a busy signal consisting of the frequencies *f*1 and *f*2. The process described until now does not differ when calling to a subscriber directly connected to the main exchange or to a satellite subscriber. At first when by operation of one of the relays MA65–MA80 in the identifier, according to the example operation of the relay MA65, it has been determined that the call concerns a satellite subscriber, minus polarity is connected through a make contact of said relay from a make contact of the relay MAA and through the wire 36 to the relay MW (FIG. 6). By means of the same minus and through a make contact of the relay MAA, the relay SW in the satellite is operated through the current path 37. Operation of the relay SW causes on one hand operation of the relay MDEA in the main exchange by means of plus from a make contact of the relay SVK2 in the satellite, through the line 12, on the other hand causes releasing of the relay SBA in the satellite. In this manner outgoing calls from the satellite are prevented during the time the setting up process of an incoming call proceeds. By the operation of the relay MDEA the current paths 44–47 are connected from contacts of the operated MB1-relay in the identifier of the main exchange through the wires 3–6, to the relays SD1–SD4 in the satellite, to which the current paths have been switched through operation of the relay SW. The relay MDEA connects also the current paths 40–43 from make contacts of the operated relays MA65–MA80 (according to the example MA65) through the wires 7–10 and through the switching contact of the relay SW to the relays SE1–SE4 in the satellite. Depending on which of the 4 current paths have been operated, the identification of 16 relays can be transmitted to the satellite as well by means of the relays SD as by means of the relays SE (for the B-relays 13 are sufficient). The relay SDA in the satellite operates secondarily to the operation of the relays SD and it connects the current paths through the make contacts of the relays SD and SE to the identifying relays, so that SB1 and SA65 operate in accordance with the identity of the calling subscriber. Secondarily to the relay SA65 the relay SAA operates (which upon an incoming call has no purpose), furthermore the relay SVMA, which connects to operating circuits the code magnets SCG1, SCG2, SC1–SC8 and the bridges SV0–SV9. Secondarily to the operation of the relay SB1 the relay SBB operates in the identifier of the satellite.

After operation of the relay MBB, the connecting relay MVMA of the selector MSLA17 belonging to the calling satellite subscriber obtains operating current through a make contact of the operated MA65-relay, to minus on a make contact of the operated MBB-relay in the main exchange. Through contacts of the relay MVMA test relays 1T0–1T9 are connected to test wires of the 10 bridges belonging to the selector, upon which only those test relays which are connected to test wires of idle bridges can operate as has been explained before in connection with an outgoing call. As explained before the connecting relay sets are permanently connected to the input of the B-bridges and test of an idle SLB-bridge is carried out by testing of an idle connecting relay set LKR. As the relay RN has operated, minus polarity is connected through the current path 5 from the switching contact of the relay RN and through the contacts of the operated test relays 1T0–1T9, to the connecting relay VMB of all the B-selectors, which can co-operate with the idle A-bridges. In said way testing paths are connected to the LKR-connecting relay sets belonging to the B-selectors in question. At first one or more of the relays F1–F5 operate which correspond to the SLB-selectors having idle bridges. One of the F-relays is selected by breaking out, upon which the relay FA releases. Secondarily the relay FB operates and all the VMB-relays except that one which corresponds to the selected F-relay, release. The relay FB connects the test wires of the connecting relay sets LKR, which belong to the selected SLB-selector, to 10 test relays G0–G9. All relays belonging to idle connecting relay sets, which are connected to idle bridges in the selected selector, will operate, upon which one of the relays G is broken out. Hereby the LKR-connecting relay set and the SLB-bridge are determined and an operating path is prepared for the bridge magnet. The relays G and F determine also the output of the SLC-selector and prepare current paths for the operation of the code magnets in the SLC-selector. By means of plus from the make contact of the relay FB one of the two secondary test relays is operated, for example 2T0 or 2T1, belonging to these two SLA-bridges which can co-operate with a definite SLB-bridge according to the grouping plan. The relays MA and MB in the identifier determine the operating current paths for the code magnets in the MSLA-selector by means of minus from the make contact of the relay GA. By means of the same, minus is carried out the operation of the SLC-code magnets and of the SLB-code magnets, the current paths depending on one hand on which of the MA-relays have been selected, on the other hand whether the SLA-bridge is located in an odd or an even vertical row according to the grouping plan. This is marked thereby that the TU- or TJ-relay operates depending on which of the two 2T-relays belonging to the same SLB-bridge has been broken out. Now code magnets in all the three selector stages operate.

Secondarily to the operation of the relay 2T0 plus polarity is connected to 4 current paths 21–24 through a make contact of the operated relay 2T0 and through wires 13–16 to the relays ST1–ST4 in the satellite. By connecting plus potential to different wires the identity of the 10 bridges can be transmitted to the satellite by preparing a current path through make contacts of the operated ST-relays for the bridge in the satellite identical with the bridge selected in the main exchange. The relay STA operates secondarily to the ST-relays. Hereby on one hand the relay SVK1 operates and prepares the operation of the bridges, on the other hand a current path is completed from a make contact of SBB and a break contact of SVK2 and through contacts of the operated SA- and SB-relays to the code magnets, according to the example to the code magnet SC1, which operates. By operation of SVK1 operating current is connected to the bridge SVO. After a time period the relay SVK2 operates with delay, in consequence of which the operating current of the bridge is interrupted, and the bridge is now set up. The BR-relay of the subscriber operates now by means of plus on the *c*-wire. The relay US in the marker of the main exchange has operated secondarily to the operation of the relay GA. Through contacts of the operated US-relay a current path is completed from plus on a break contact of K2, make contact of US, make contact of MVMA, the winding of the MVO-bridge, make contact of MVMA, make contact of the test relay 2T0, make contact of US, to minus polarity on the break contact of K2. K2 operates with delay secondarily to US and interrupts the operating current of the bridge, in consequence of which the bridge in the main exchange is now set up. Also operation of the B-bridge is carried out through a make contact of the US-relay and through a make contact of the operated G-relay. Operation of the SLC-bridge is carried out by means of the relay VK1, which operates by means of minus from the make contact of the relay US through the current path FK and through the make contact of the relay BG in KMS and it connects through contacts of the operated relays BB, BA and B, minus polarity to the bridge magnet, so that now also the SLC-bridge is set up. Furthermore the relay VK1 connects plus polarity from the contact of the relay BG to the busy relay FO of the bridge SLC, which relay operates and holds itself through its own contact by means of plus on the test wire of the incoming line and interrupts this wire in the direction of the IDC-identifier, upon which IDC, KMS and SLM are released. The relay F0 connects plus polarity to the *c*-wire in forward direction, whereby L1 in the selected connecting relay set LKR operates and interrupts the test wire for LKR in the direction of the SLM-marker as a sign that the connecting circuit is busy. L1 connects plus polarity to the *c*-wire and to the *d*-wire in forward direction for subscriber test respectively for marking that the SLA-bridge is busy (the SLB-bridge is already busy-marked by the busy condition of the connecting circuit) and connects the *a*- and *b*-wires to the terminal of the subscriber in the selected bridge. If the subscriber is a satellite subscriber, the wires *a* and *b* will be connected to the terminal of the satellite subscriber through the pair of conductors connecting the input of the SLB-bridge with the input of the satellite bridge, so that the ring-trip relay L2 is connected into the subscriber loop, the *c*-wire on the other hand is only connected to the input of the main bridge. When the subscriber has answered, the relay L2 will operate, whereby the calling subscriber is connected to the current feeding relay L4 and the conversation is set up. As mentioned before in connection with the outgoing call, in the marker of the main exchange one of the 40 relays U1–U40 is always operated corresponding to each busy bridge. The purpose of said relays will be explained in connection with the resetting process.

When the IDC-identifier is released as a consequence of that the plus polarity from the test wire of the incoming line ceases upon the operation of the relay F0, the BB-relay will release. Hereby T2 releases, which causes that AKM and BG release. Releasing of the relay AKM causes releasing of the relay MS8 and MB1 in the identifier of the main exchange. Releasing of MB1 causes releasing of MBA, releasing of LL and releasing of SD in the satellite. Secondarily to these relays SB1 releases in the satellite. Secondarily to the releasing of the relay MBA in the main exchange, the relay MBB releases and MK1 operates. By operation of the relay MK1, MA65 releases. By releasing of MBB in the main exchange MRN and K2 release. By releasing of MAA, MW in the main exchange and SW in the satellite will release. Releasing of SW in the satellite causes releasing of MDEA in the main exchange and of SVMA in the satellite and restoring of SBA in the satellite, after which all the relays as well in the satellite as in the main exchange release in turn.

Owing to the fact that the bridges of the code relay selectors are currentless and they consequently obtain current only upon operation and are maintained in operated condition by means of spring force, it is necessary to restore to home position those bridges which no longer are busy in conversation in order to hereby release the interrupting relay BR of the satellite subscriber held from the operated satellite bridge. As mentioned before one busy relay U1–U40 corresponds to each of the 40 satellite bridges. The relay corresponding to the bridge is maintained operated as long the bridge is busy. When the conversation is finished, also the plus polarity of the *d*-wire of the bridge (current path 4) ceases, whereby the respective U-relay releases. Consequently it will be necessary to operate the bridge in such manner that it obtains an operating impulse without operating the code magnets, in order to bring hereby the bridge to home or restored position. Through a break contact of the released U-relay, plus polarity is connected to an identifier, consisting of 10 relays HT0–HT9 for identifying of the number of the bridge which has become idle and 4 relays AH1–AH4 in order to determine to which the 4 selectors the bridge belongs which has become idle. Each of the 40 bridges has a contact HV, which only is closed, when the bridge is set up. In the drawing only the contacts HV0–HV9 of the selector MSLA17 are shown. Thus upon releasing of some of the relays U1–U4, for example U1, a current path is completed from plus through a make contact of HV0, through a contact of U1, through a resistance and through the winding of the HT0-relay to minus. HT0 operates and connects the current path to the wires 15–18 which conduct to the relays AH1–AH4. As the current path through the break contact of U1 had plus potential, the relay AH1 obtains plus potential through the current path 15. Hereby the bridge MV0 in the selector MSLA17 is identified. Secondarily to AH1, MAA operates and secondarily to the latter operates the connecting relay MVMA by means of minus from a make contact of MAA and a make contact of AH1. The bridge MV0 in MSLA17 obtains operating current by means of plus through a make contact of the relay AH1 through the current path 25, through make contacts of MVMA, through the wire 10, through a make contact of HT1 and the current path 39 to minus through AH1. Hereby MV0 obtains an operating impulse, HVK operates and interrupts for the bridge, so that the bridge is now restored. HVK is however maintained operated as long as the restoring in the satellite is not finished. Operation of the relay MAA in the main exchange causes operation of the relay MW through a make contact of the relay AH1 and through the current path 36. Furthermore the operation of the relay MAA causes also operation of the relay SW in the satellite through the current path 37 and through the wire 1 between the main exchange and the satellite. By operation of SW in the satellite, plus polarity is connected through the conductor 12 to the relay MDEA in the main exchange as an acknowledgement that the bridge resetting signal has been obtained. By operation of the relay MDEA current paths 40–43 are connected to the satellite through make contacts of this relay from make contacts of the relays AH1–AH4 which determine in which selector the bridge is located. By transmitting this identification to one of the 4 SA-relays, which belong to a selector, for example to SA68 in the case of the selector SSLA17, also the selector is determined. The identification of these relays is transmitted from the main exchange to the satellite through the conductors 7–10 and by operation of the corresponding SE-relays a current path is obtained to the relay SA68 in the satellite. In a corresponding manner the identity of the bridge is transmitted by means of the current paths 21–24 from the contacts of the operated HT0-relay, through the conductors 13–16 to the satellite, in which current paths are obtained, through the make contacts of the operated relays ST. Secondarily to the operation of the SE-relays in the satellite the relay SDA operates and connects operating plus to the relay SA68. Secondarily to the operation of the relays ST the relay STA operates and prepares an operating current path for SVK1 in order to control that the resetting to home position should not begin before the bridge identity has been received. Secondarily to the operation of the relay SA68 the connecting relay SVMA operates causing operation of the relay SVK1. Secondarily to SVK1 the relay SVK2 operates. Operation of SVK1 causes operation of the bridge SVO, whereby the operating current is interrupted after a certain time period, as SVK2 operates with delay. SVK2 interrupts also the current to MDEA as a sign that the bridge in the satellite has been restored. After this the releasing of the relay MDEA causes releasing of the relays HT0, MK1, AH1, and MAA, HVMA, HVK and finally MW in the main exchange. Releasing of MDEA in the main exchange causes releasing of the ST-relays, of the SE-relays and of all the remaining relays in the satellite.

It is evident that the invention is not limited to a telephone system working with code relay selectors but the principle of the invention can be applied on a telephone system working for example with conventional cross bar selectors.

We claim:

In a telephone system, in combination, at least one main exchange and at least one satellite exchange coacting with the main exchange, each of said exchanges comprising crossbar selector switches forming multiple contact bridges, at least the switches in the main exchange being arranged in at least two stages, one of said stages being a subscriber stage to which subscriber lines are connected and the other being a further stage, said main exchange including an identifier connected for identifying a subscriber and a marker for setting up a connection to and from a subscriber through idle switches, said satellite exchange including an identifier for identifying subscribers assigned to the satellite exchange, the lines of said satellite exchange subscribers being connected to the bridge outputs in said satellite exchange, each of the bridges of the satellite exchange having a corresponding bridge in the subscriber stage of the main exchange, the inputs of said bridges in the satellite exchange and of the corresponding bridge in the main exchange being connected in parallel to said further stage in the main exchange, and conductors connecting the identifier of the satellite exchange and the marker of the main exchange in circuits in which each of the satellite bridges in response to an incoming and an outgoing call respectively is set up for the same output as its corresponding bridge in the main exchange whereby the operation of the subscriber stage in the main exchange is the same for a subscriber's line connected to the satellite exchange and a subscriber's line connected directly to the subscriber stage in the main exchange respectively.

References Cited in the file of this patent

UNITED STATES PATENTS

| | | |
|---|---|---|
| 2,532,097 | Hersey | Nov. 28, 1950 |
| 2,724,744 | Brewer et al. | Nov. 22, 1955 |
| 2,812,385 | Joel et al. | Nov. 5, 1957 |
| 2,837,602 | Lundkvist | June 3, 1958 |
| 2,944,115 | Heuquet et al. | July 5, 1960 |